United States Patent
Ueno et al.

(10) Patent No.: US 8,607,469 B2
(45) Date of Patent: Dec. 17, 2013

(54) CEMENT BURNING APPARATUS AND METHOD OF DRYING HIGH-WATER-CONTENT ORGANIC WASTE

(75) Inventors: Naoki Ueno, Saeki (JP); Yoshihito Izawa, Thanh Hoa Provincem (VN); Hiroyuki Takano, Sakura (JP); Hirofumi Mori, Chuo-ku (JP)

(73) Assignee: Taiheiyo Cement Corporation, Akashi-Cho, Chuo-Ku, Tokyo (JP)

(*) Notice: Subject to any disclaimer, the term of this patent is extended or adjusted under 35 U.S.C. 154(b) by 723 days.

(21) Appl. No.: 12/306,707
(22) PCT Filed: Jun. 26, 2007
(86) PCT No.: PCT/JP2007/062752
§ 371 (c)(1), (2), (4) Date: Sep. 1, 2009
(87) PCT Pub. No.: WO2008/001747
PCT Pub. Date: Jan. 3, 2008

(65) Prior Publication Data
US 2010/0000119 A1  Jan. 7, 2010

(30) Foreign Application Priority Data
Jun. 28, 2006 (JP) ................... 2006-177660
Feb. 15, 2007 (JP) ................... 2007-034206

(51) Int. Cl.
F26B 19/00 (2006.01)
F26B 3/00 (2006.01)
F23G 5/04 (2006.01)

(52) U.S. Cl.
USPC ................... 34/86; 34/443; 110/224

(58) Field of Classification Search
USPC ............... 34/493, 58, 103, 516, 86, 181, 373, 34/443; 75/318, 326; 241/17, 18; 106/693; 110/224, 226
See application file for complete search history.

(56) References Cited

U.S. PATENT DOCUMENTS
3,618,916 A * 11/1971 Giorgi ................. 432/58
7,264,781 B2 * 9/2007 Jones ................. 422/129
(Continued)

FOREIGN PATENT DOCUMENTS
CN 1683895 A * 10/2005
EP 1219336     7/2002
(Continued)

OTHER PUBLICATIONS
Toshiaki Murata, "Coal Preparation Technology for Moderation of Environmental Pollution," Journal "Doryoku (Power)" No. 248 extra issue, 1998.
(Continued)

Primary Examiner — Kenneth Rinehart
Assistant Examiner — John McCormack
(74) Attorney, Agent, or Firm — Stetina Brunda Garred & Brucker

(57) ABSTRACT

Provided is cement burning apparatus 1 comprising a dryer 6 for drying high-water-content organic waste of which water content is 40 mass percent or more, in which combustion gas extracted from outlet portions or ceiling, portions of preheater cyclones 3A to 3D of a cement kiln 2 is fed to the dryer 6. As the dryer 6, a grinding-type flash dryer, which directly contacts the combustion gas G with the high-water-content organic waste W while grinding it, can be used. In addition, the apparatus 1 further comprises a coarse powder separator 12 for separating coarse powder from the combustion gas extracted from the range described above, and the combustion gas G from which dust is separated by the coarse powder separator 12 can be fed to the dryer 6, and the dust concentration of the gas fed to the dryer 6 may be adjusted to 0.05kg/Nm³ or more and 0.35kg/Nm³ or less.

20 Claims, 3 Drawing Sheets

(56) References Cited

U.S. PATENT DOCUMENTS

| | | | |
|---|---|---|---|
| 7,895,769 B2 * | 3/2011 | Jochem et al. | 34/385 |
| 2005/0274293 A1 * | 12/2005 | Morton et al. | 106/745 |

FOREIGN PATENT DOCUMENTS

| | | |
|---|---|---|
| JP | 5344472 | 4/1978 |
| JP | 5386720 | 7/1978 |
| JP | 62283850 | 12/1987 |
| JP | 2116649 | 5/1990 |
| JP | 3221147 | 9/1991 |
| JP | 5238788 | 9/1993 |
| JP | 5293385 | 11/1993 |
| JP | 6335700 | 6/1994 |
| JP | 775720 | 3/1995 |
| JP | 7213950 | 9/1995 |
| JP | 7299331 | 11/1995 |
| JP | 09295841 | 11/1997 |
| JP | 200024625 | 1/2000 |
| JP | 2000146458 | 5/2000 |
| JP | 2000239050 | 9/2000 |
| JP | 2001198434 | 7/2001 |
| JP | 2002180146 | 6/2002 |
| JP | 2002219335 | 8/2002 |
| JP | 2002273480 | 9/2002 |
| JP | 2002282639 | 10/2002 |
| JP | 2002355531 | 12/2002 |
| JP | 2004244308 | 9/2004 |
| JP | 200597063 | 4/2005 |
| JP | 2005104792 | 4/2005 |
| JP | 2006153339 A * | 6/2006 |
| WO | WO2004/052801 | 6/2004 |

OTHER PUBLICATIONS

Mitsui Engineering & Shipbuilding Co., Ltd., "De-Ashing and De-Sulfurizing Equipment Based on M-COL Technology," Journal, No. 154, 1995.

* cited by examiner

CEMENT BURNING APPARATUS AND METHOD OF DRYING HIGH-WATER-CONTENT ORGANIC WASTE

CROSS-REFERENCE TO RELATED APPLICATIONS

The present application claims priority to International Application No. PCT/JP2007/062752 which was filed on Jun. 26, 2007 and claims priority to Japanese Patent Application No. 2006-177660 filed on Jun. 28, 2006 and Japanese Patent Application No. 2007-034206 filed on Feb. 15, 2007.

STATEMENT RE: FEDERALLY SPONSORED RESEARCH/DEVELOPMENT

Not Applicable

BACKGROUND OF THE INVENTION

1. Technical Field of the Invention

The present invention relates to a cement burning apparatus capable of safely and efficiently drying high-water-content organic waste such as high-water-content organic sludge and a method of drying high-water-content organic waste utilizing the apparatus.

2. Description of the Related Art

Conventionally, variety of apparatus and methods for treating waste such as city garbage in cement burning apparatus has been proposed. For instance, in the patent document 1 is disclosed a technology, in which a part of hot air from a clinker cooler is introduced to a dryer for drying waste such as city garbage; gas exhausted from the dryer is returned to the clinker cooler; and the hot air, with which the exhaust gas is mixed, from the clinker cooler is used as air for combustion in a cement kiln or a calciner.

Further, in the patent document 2, a technology for burning combustible waste in cement burning apparatus is disclosed. In this technology, combustible waste is burned with a part of hot air from a clinker cooler; exhaust gas generated in a waste burning process is aerated to a preheater for heating cement raw material; and sludge generated in the waste burning process is extracted.

However, as described in the above patent documents, the hot air extracted from the clinker cooler can be utilized for drying waste such as city garbage, combustible waste and the like without causing any trouble, but when the hot air is utilized for drying high-water-content organic waste such as high-water-content-organic sludge, oxygen concentration of the hot air is high so that there is a danger of explosion.

In addition, even if combustion exhaust gas downstream from the exit of a preheater of a cement burning apparatus was tried to be utilized, since temperature of the combustion exhaust gas in the range was low, that is, 450° C. or less, the gas would not be suitable to dry the high-water-content sludge. On the other hand, gas extracted from the inlet end of a cement kiln is low in oxygen concentration and high in temperature, that is, approximately 1000° C., so that it is suitable to dry the high-water-content organic waste, but extraction of the combustion gas from the inlet end causes a problem that thermal efficiency of the cement kiln decreases.

In consideration of the above problems, the present applicant has eagerly investigated and found that oxygen concentration of the combustion gas extracted from the exhaust gas passage, which runs from the outlet duct of the calciner to the outlet duct of the preheater of the cement kiln is low, that is, 2 to 8 percent, so that there is no danger of explosion, and since temperature of the combustion gas is 450 to 900° C., the high-water-content organic waste can sufficiently be dried and combustion gas is not extracted from the inlet end or the like of the cement kiln, which does not decrease thermal efficiency of the cement kiln.

Patent document 1: Japanese Patent Publication Showa 63-151650 gazette

Patent document 2: Japanese Patent Publication 2003-506299 gazette

As described above, in order to dry high-water-content sludge etc., the combustion gas extracted from the exhaust gas passage, which runs from the outlet duct of the calciner to the outlet duct of the preheater of the cement kiln, can be used. But, the gas exhausted from the cement kiln as a hot source gas for drying contains incombustible dust derived from cement raw material, and most of the dust is recovered in dried sludge. In addition, dust concentration of the cement kiln exhaust gas is between approximately 0.05 kg/Nm$^3$ (at an outlet portion of the highest cyclone) and approximately 1.0 kg/Nm$^3$ (at an inlet portion of each cyclone), which means that the concentration considerably varies with area from which the combustion gas is extracted.

Here, the dried sludge containing dust derived from cement raw material has advantages and disadvantages. An advantage is that the dried sludge containing incombustible dust reduces danger of explosion at a facility for drying. On the contrary, a disadvantage is that the dried sludge containing incombustible dust reduces value of the dried sludge as a fuel.

In addition to the above, the high-water-content organic sludge shapes clumps including 40 mass percent of water or more like clay and its specific surface area is small, which makes it difficult to efficiently dry the organic sludge.

The present invention has been made in consideration of the above problems in the conventional art, and the object thereof is to provide a cement burning apparatus and a method of drying high-water-content organic waste reducing the danger of explosion at the facility for drying; not causing decreased value of the dried sludge as a fuel; and efficiently drying high-water-content organic waste.

BRIEF SUMMARY OF THE INVENTION

To achieve the above object, the present invention relates to a cement burning apparatus, and the apparatus is characterized by comprising: a dryer for drying high-water-content organic waste of which water content is 40 mass percent or more, wherein combustion gas extracted from one of an exhaust gas passage from a gas outlet to a portion immediately before a material feed portion and a ceiling portion of a preheater cyclone of a cement kiln other than a highest cyclone is fed to the dryer.

In this invention, from one of an exhaust gas passage from a gas outlet to a portion immediately before a material feed portion and a ceiling portion of a preheater cyclone of a cement kiln other than a highest cyclone is extracted a part of combustion gas with low dust concentration, and in a dryer is dried high-water-content organic waste of which water content is 40 mass percent or more by using the part of combustion gas of low dust content, so that dust content of the organic waste after dried also becomes low, which prevents decreased value of the dried organic waste as a fuel.

The above cement burning apparatus may further comprise a coarse powder separator for separating coarse powder from the combustion gas extracted from one of the exhaust gas passage from the gas outlet to the portion immediately before the material feed portion and the ceiling portion of the preheater cyclone of the cement kiln, wherein combustion gas from which the coarse powder is separated by the coarse powder separator is fed to the dryer. With this construction, dust content of the organic waster after dried can be lower, which further increases the value of the dried organic waste as a fuel.

In the above cement burning apparatus, the dryer can be a grinding-type flash dryer, to which the combustion gas is fed so as to directly be contacted with the high-water-content organic waste, for drying the organic waste while grinding it. With this, improved drying efficiency through increased specific surface area of the high-water-content organic waste and improved grinding efficiency through superficial drying of the high-water-content organic waste can between them exponentially improve overall drying efficiency.

In the above cement burning apparatus, dust concentration of the gas that is fed to the dryer can be 0.05 kg/Nm$^3$ or more and 0.35 kg/Nm$^3$ or less. With this, it becomes possible to reduce the danger of explosion at a facility for drying while preventing decreased value of dried sludge as a fuel.

In the above cement burning apparatus, the high-water-content organic waste may be high-water-content organic sludge, and paper sludge, sewerage sludge, building pit sewerage sludge, food sludge and so on may be dried.

Further, the present invention relates to a method of drying high-water-content organic waste, and the method is characterized by comprising the steps of: extracting a part of combustion gas of which dust concentration is in a predetermined range from an exhaust gas passage, which runs from an outlet duct of a calciner to an outlet duct of a preheater of a cement kiln; and drying high-water-content organic waste of which water content is 40 mass percent or more by using the part of extracted combustion gas.

With this invention, since high-water-content organic waste is dried with a combustion gas of which dust concentration is in a predetermined range, it becomes possible to adjust dust concentration of the dried organic waste.

Further, the present invention relates to a method of drying high-water-content organic waste, and the method is characterized by comprising the steps of: extracting a part of combustion gas from an exhaust gas passage, which runs from an outlet duct of a calciner to an outlet duct of a preheater of a cement kiln; and adjusting concentration of dust contained in the extracted combustion gas to a predetermined range; and drying high-water-content organic waste of which water content is 40 mass percent or more by using the gas of which dust concentration is adjusted to the predetermined range.

With this invention, since high-water-content organic waste is dried with a combustion gas of which dust concentration is in a predetermined range, it becomes possible to adjust dust concentration of the dried organic waste.

In the above method of drying high-water-content organic waste, the part of the combustion gas may directly be contacted with the high-water-content organic waste, and the organic waste can be dried while being ground. With this, as described above, overall drying efficiency can exponentially be improved.

the above method of drying high-water-content organic waste, dust concentration of the gas used for drying the high-water-content organic waste can be 0.05 kg/Nm$^3$ or more and 0.35 kg/Nm$^3$ or less. With this, as described above, it becomes possible to reduce the danger of explosion at a facility for drying while preventing decreased value of dried sludge as a fuel.

In the above method of drying high-water-content organic waste, the high-water-content organic waste may be high-water-content organic sludge such as paper sludge, sewerage sludge, building pit sewerage sludge and food sludge.

As described above, with the present invention, it is possible to provided a cement burning apparatus and a method of drying high-water-content organic waste reducing the danger of explosion at the facility for drying; not causing decreased value of the dried sludge as a fuel; and efficiently drying high-water-content organic waste.

DETAILED DESCRIPTION OF THE INVENTION

Figure 1:
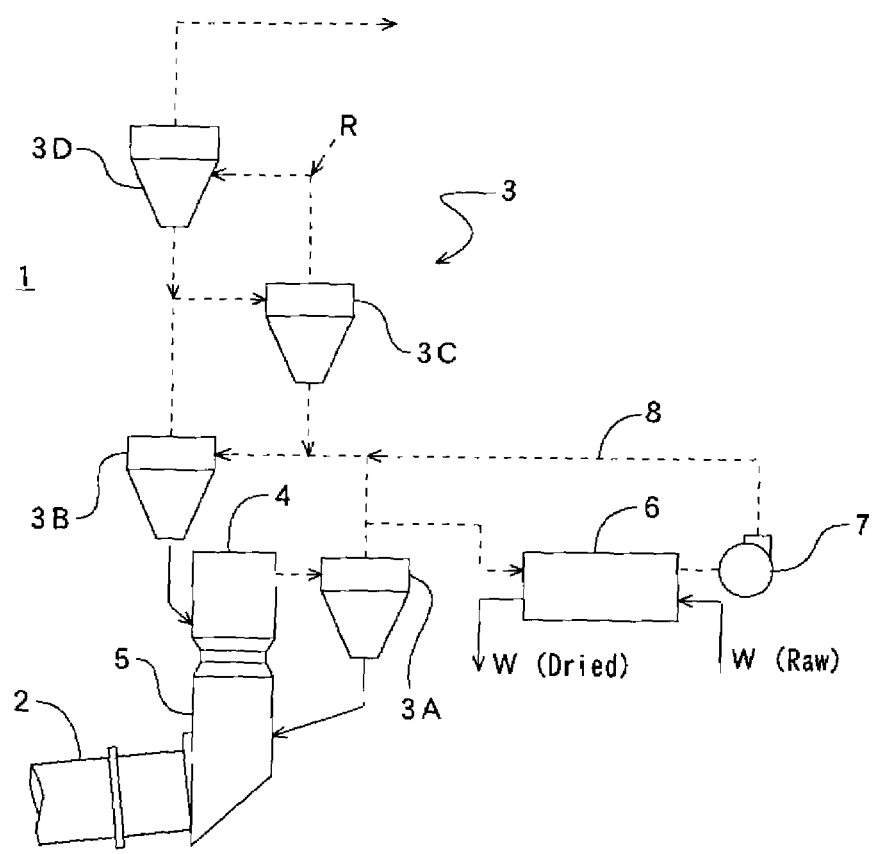
FIG. 1 is a schematic showing overall construction of the cement burning apparatus according to the first embodiment of the present invention.

FIG. 1 shows a cement burning apparatus according to the first embodiment of the present invention, this cement burning apparatus 1 comprises a cement kiln 2, a preheater 3, a calciner 4, a dryer 6, a fan 7 and others.

The cement kiln 2, the preheater 3 and the calciner 4 have the same construction as conventional cement burning apparatus, and cement raw material R fed to the preheater 3 is preheated in the preheater 3; calcined in the calciner 4; and burned in the cement kiln 2.

To the dryer 6 is fed high-water-content organic waste (hereinafter referred to as "waste") W such as high-water-content organic sludge, and to the dryer 6 is fed combustion gas extracted from an outlet portion of the lowest cyclone 3A to dry the waste W. The combustion gas is extracted from a duct from the outlet portion of the lowest cyclone 3A to an inlet portion of the second cyclone 3B and in the stage before cement raw material fed from the third cyclone 3C is mixed with the combustion gas, so that the combustion gas is low in dust content, that is, approximately 0.15 to 0.35 kg/cm$^3$. As a result, when the gas is used for drying the waste W in the dryer 6, dust concentration of the waste W becomes proper, which makes it possible to maintain the dust content of the waste W low while preventing explosion in the dryer 6.

The fan 7 is installed to introduce combustion gas from the preheater 3 to the dryer 6, and exhaust gas from the fan 7 is returned to the exhaust gas passage, which runs from the lowest cyclone 3A to the second cyclone 3B via a circulation duct 8.

Meanwhile, although in the embodiment described above, to the dryer 6 is fed the combustion gas extracted from the outlet portion of the lowest cyclone 3A, not only from the outlet portion of the lowest cyclone 3A, but combustion gas extracted from a portion selected from a ceiling portion of the lowest cyclone 3A, outlet portions and ceiling portions of the second cyclone 3B, the third cyclone 3C and the forth cyclone 3D can be fed to the dryer 6 to use the combustion gas for drying the waste W, resulting in the same effect as described above.

Figure 2:
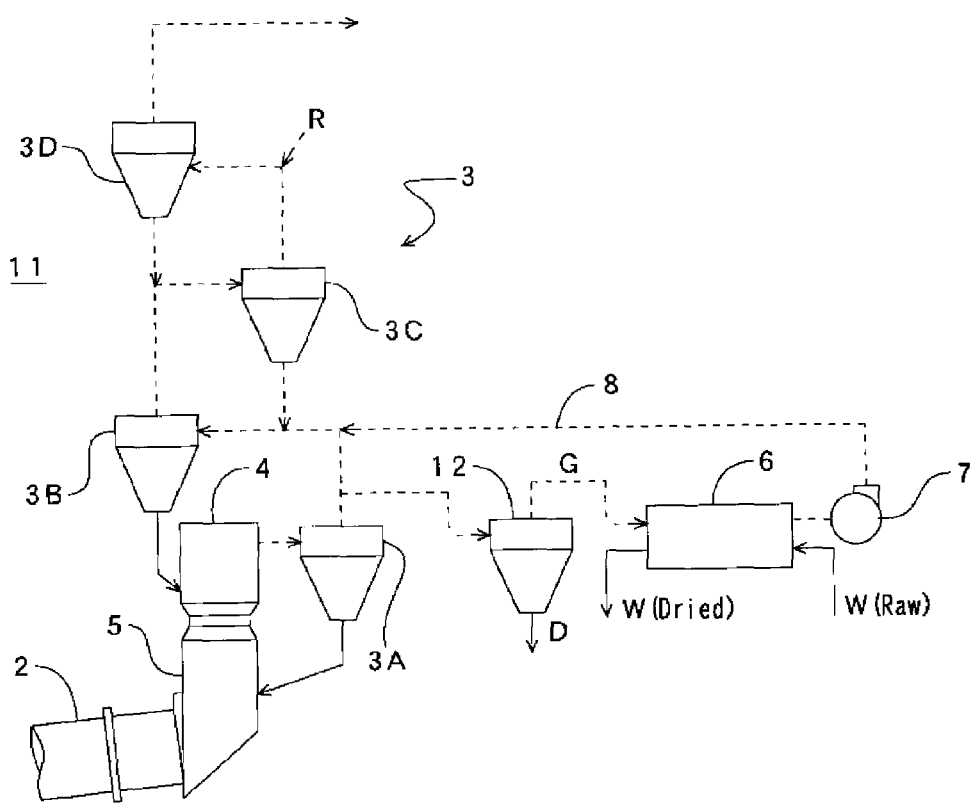
FIG. 2 is a schematic showing overall construction of the cement burning apparatus according to the second embodiment of the present invention.

Next, a cement burning apparatus according to the second embodiment of the present invention will be explained with reference to FIG. 2. This cement burning apparatus 11 is characterized by comprising, in addition to the construction of the cement burning apparatus 1 shown in FIG. 1, a cyclone 12 as a coarse powder separator upstream from the dryer 6. Below, to the same composing element as the cement burning apparatus 1 is added the same reference number and the detailed explanation thereof will be omitted.

To the cyclone 12 is fed combustion gas extracted from the outlet portion of the lowest cyclone 3A, and coarse power D in the gas is removed. The removed coarse powder D may be returned to the cement burning apparatus 1 and can be treated out of the cement burning apparatus 1. Combustion gas G containing fine powder, which is not recovered by the cyclone 12, is fed to the dryer 6.

To the dryer 6 is fed the waste W as well as the combustion gas G from the cyclone 12 to dry the waste W. Dust contained in this combustion gas G is collected by the cyclone 12, so that dust content of the gas is low, that is 0.05 to 0.2 kg/Nm$_3$, when used for drying the waste W, it becomes possible to maintain the dust content of the waste W low while preventing explosion in the dryer 6.

Meanwhile, although in the embodiment described above, to the cyclone 12 is fed the combustion gas extracted from the outlet portion of the lowest cyclone 3A, not only from the outlet portion of the lowest cyclone 3A, but combustion gas extracted from a portion selected from a ceiling portion of the lowest cyclone 3A, outlet portions and ceiling portions of the second cyclone 3B, the third cyclone 3C and the forth cyclone 3D can be fed to the cyclone 12 to use the combustion gas G without coarse powder for drying the waste in the dryer 6, resulting in the same effect as described above.

Figure 3:
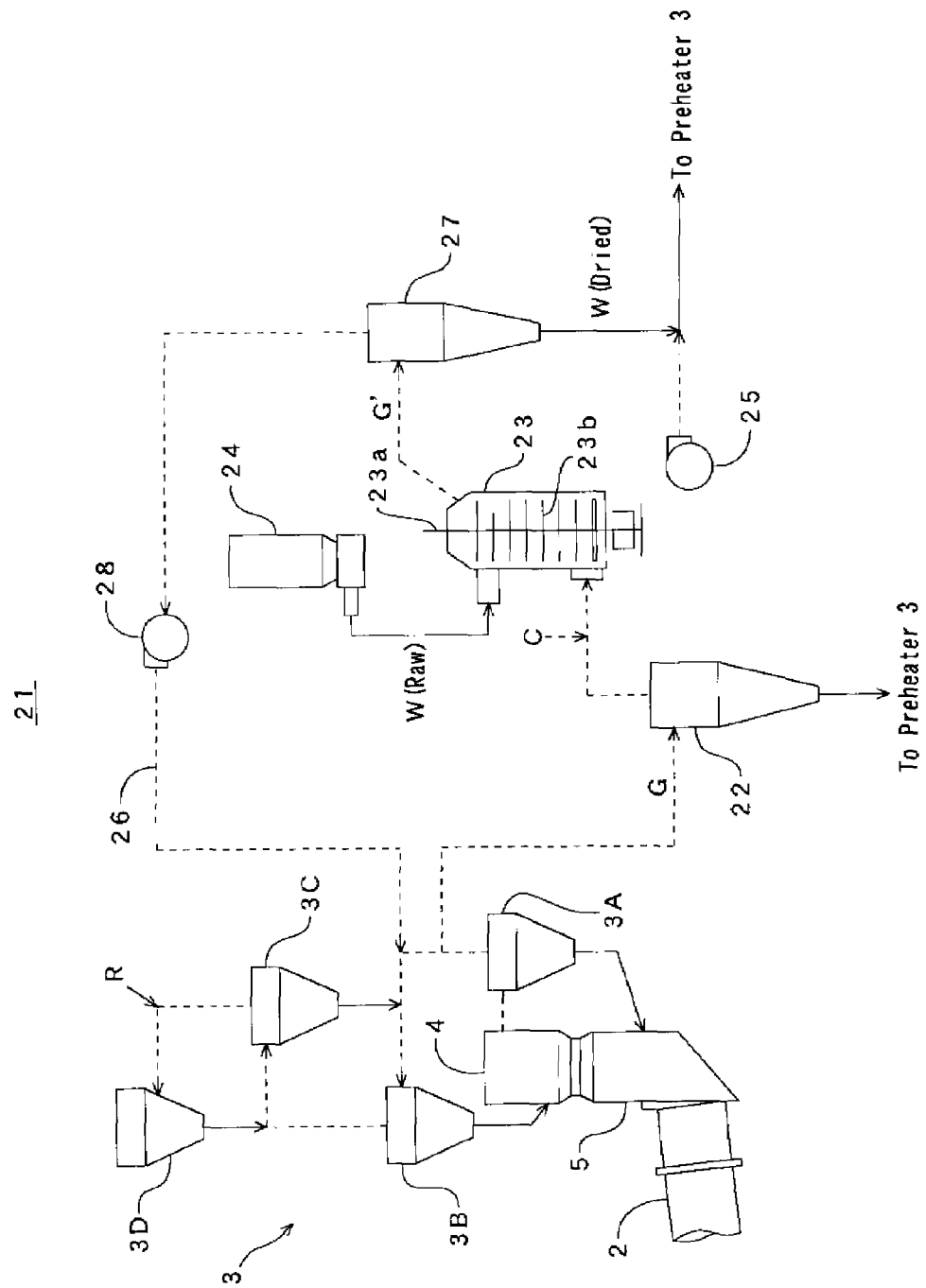
FIG. 3 is a schematic showing overall construction of the cement burning apparatus according to the third embodiment of the present invention.

Next, a cement burning apparatus according to the third embodiment of the present invention will be explained with reference to FIG. 3. This cement burning apparatus 21 is characterized in that the cyclone 12 and the dryer 6 of the cement burning apparatus 11 shown in FIG. 2 are exemplified as a cement-raw-material recovery cyclone 22 and a grinding-type flash dryer 23 respectively and is characterized by further comprising a high-water-content organic waste storage tank (hereinafter referred to as "waste storage tank") 24 and dried organic waste recovery cyclone (hereinafter referred to as "dried material recovery cyclone") 27 and so on. Below, to the same composing element as the cement burning apparatus 11 is added the same reference number, and the detailed explanation thereof will be omitted.

The cement-raw-material recovery cyclone 22 is installed upstream from the grinding-type flash dryer 23 to remove dust included in combustion gas G extracted from the exhaust gas passage of the preheater 3 and to feed the combustion gas G of which dust is removed to the grinding-type flash dryer 23.

The grinding-type flash dryer 23 is installed to dry the waste W fed from the waste storage tank 24 with the combustion gas G fed from the cement-raw-material recovery cyclone 22 while grinding the waste W. This grinding-type flash dryer 23 is provided with a feed opening for the waste W in the upper portion thereof and a feed opening for the combustion gas G from the cement-raw-material recovery cyclone 22 in the lower portion thereof, and the waste W and the combustion gas G are counter-currently contacted with each other. Further, in the grinding-type flash dryer 23 are installed a rotation shaft 23*a* and strike chains 23*b*, which are fixed to the rotation shaft 23*a* and horizontally extend and rotate through centrifugal force together with the rotation of the rotation shaft 23*a* to grind the waste W.

The waste storage tank 24 is installed to temporarily store high-water-content organic waste and the high-water-content organic waste can be high-water-content organic sludge such as paper sludge, sewerage sludge, building pit sewerage sludge and food sludge.

A blower 25 is installed to transport the waste W ground and dried by the grinding-type flash dryer 23 to the preheater 3, and a roots blower or the like may be utilized. A fan 28 is installed to return dry exhaust gas G' discharged from the grinding-type flash dryer 23 via a circulation duct 26 to the preheater 3.

Next, the motion of the cement burning apparatus 21 with the above construction will be explained with reference to figures.

Cement raw material R is fed to the preheater 3 of the cement burning apparatus 21, and the raw material R is preheated in the preheater 3; calcined in the calciner 14; and burned in the cement kiln 2. On the other hand, received waste W is temporarily stored in the waste storage tank 24.

The fan 28 is operated to introduce the combustion gas G of the cement kiln 2 to the cement-raw-material recovery cyclone 22, and dust included in the combustion gas G is recovered. The recovered dust is returned to the preheater 3, and the combustion gas G from which the dust is recovered is fed to the grinding-type flash dryer 23.

The waste W from the waste storage tank 24 is fed to the upper portion of the grinding-type flash dryer 23, and the combustion gas G from the cement-raw-material recovery cyclone 22 is introduced to the lower portion of the grinding-type flash dryer 23. Since temperature of this combustion gas G is approximately 800 to 900°, high-water-content organic waste can sufficiently be dried. In addition, in the grinding-type flash dryer 23, the waste W and the combustion gas G are directly and counter-currently contacted with each other, and the waste W is dried while being ground by strike chains 23*b* arranged in the grinding-type flash dryer 23, the waste W is dried from its surface with specific surface area thereof increasing. As a result, in addition to improved drying efficiency due to the increase of the specific surface area, grinding efficiency is also improved due to the dried surface of the waste W, resulting in exponential improvement in overall drying efficiency in comparison to conventional devices. Besides, oxygen concentration of the combustion gas G introduced into the grinding-type flash dryer 23 is low, that is, approximately 2 to 8 percent, so that there is no danger of explosion of the grinding-type flash dryer 23 and others.

Here, in case that outlet gas temperature of the grinding-type flash dryer 23 is too high, which may caused by temporary decrease of the quantity of the waste W to the grinding-type flash dryer 23, cooling air C can be introduced upstream from the grinding-type flash dryer 23.

Next, with the dried-material recovery cyclone 27, the ground and dried waste W by the grinding-type flash dryer 23 is recovered, and is returned to the preheater 3 by operating the blower 25. In addition, the recovered waste W can be transported by the blower 25 to apparatus other than the cement burning apparatus 21, and the waste W can be treated by the apparatus.

On the other hand, the dry exhaust gas G' discharged from the grinding-type flash dryer 23 is returned to an exhaust gas passage, which runs from the lowest cyclone 3A to the second cyclone 3B through the circulation duct 26 by the fan 28. With this, odorous component included in the dry exhaust gas G' generated after organic sludge and the like is dried can be subject to deodorization treatment.

Meanwhile, although in the embodiment described above, the combustion gas G extracted from the exhaust gas passage, which runs from the lowest cyclone 3A to the second cyclone 3B is fed to the grinding-type flash dryer 23, combustion gases extracted from exhaust gas passages upstream from the second cyclone 3B of the preheater 3, which run from the second cyclone 3B to the third cyclone 3C (temperature of the combustion gas is approximately 700 to 800°) and from the third cyclone 3C to the forth cyclone 3D (temperature of the combustion gas is approximately 550 to 650°) can also be fed to the grinding-type flash dryer 23.

Further, as to the dry exhaust gas G' also, it is not limited that the gas G' is returned to the exhaust gas passage, which runs from the lowest cyclone 3A to the second cyclone 3B, but the gas G' can be returned to the same area as in the case that the combustion gas G described above is extracted.

EXPLANATION OF SIGNALS 1 cement burning apparatus
2 cement kiln
3 preheater
3A lowest cyclone
3B second cyclone
3C third cyclone
3D forth cyclone
4 calciner
5 kiln inlet end
6 dryer
7 fan
8 circulation duct
11 cement burning apparatus
12 cyclone
21 cement burning apparatus
22 cement-raw-material recovery cyclone
23 grinding-type flash dryer
23a rotation shaft
23b strike chains
24 waste storage tank
25 blower
26 circulation duct
27 waste recovery cyclone
28 fan
C cooling air
D coarse powder
G combustion gas
G' dry exhaust gas
R cement raw material
W high-water-content organic waste (high-water-content organic sludge)

The invention claimed is:

1. A method of drying high-water-content organic waste comprising the steps of:
   extracting only a part of combustion gas of which dust concentration is in a predetermined range from an exhaust gas passage, which runs from an outlet of a preheater cyclone other than a highest cyclone to a portion immediately below a material feed portion of another cyclone immediately above the cyclone;
   drying high-water-content organic waste of which water content is 40 mass percent or more by using said part of extracted combustion gas;
   returning the combustion gas to the exhaust gas passage; and
   discharging dried waste via a fluid passage fluidly separate and isolated from passage that extends between a preheater and a cement kiln.

2. A method of drying high-water-content organic waste comprising the steps of:
   extracting only a part of combustion gas from an exhaust gas passage, which runs from an outlet of a preheater cyclone other than a highest cyclone to a portion immediately below a material feed portion of another cyclone immediately above the cyclone; and
   adjusting concentration of dust contained in the extracted combustion gas to a predetermined range;
   drying high-water-content organic waste of which water content is 40 mass percent or more by using said gas of which dust concentration is adjusted to the predetermined range;
   returning the combustion gas to the exhaust gas passage; and
   discharging dried waste via a fluid passage fluidly separate and isolated from a passage that extends between a preheater and a cement kiln.

3. The method of drying high-water-content organic waste as claimed in claim 1, wherein said part of combustion gas is directly contacted with the high-water-content organic waste, and said high-water-content organic waste is dried while being ground.

4. The method of drying high-water-content organic waste as claimed in claim 1, wherein dust concentration of said gas used for drying the high-water-content organic waste is 0.05 kg/Nm$^3$ or more and 0.35 kg/Nm$^3$ or less.

5. The method of drying high-water-content organic waste as claimed in claim 1, wherein said high-water-content organic waste is high-water-content organic sludge.

6. The method of drying high-water-content organic waste as claimed in claim 2, wherein said part of combustion gas is directly contacted with the high-water-content organic waste, and said high-water-content organic waste is dried while being ground.

7. The method of drying high-water-content organic. waste as claimed in claim 2, wherein dust concentration of said gas used for drying the high-water-content organic waste is 0.05 kg/Nm$^3$ or more and 0.35 kg/Nm$^3$ or less.

8. The method of drying high-water-content organic waste as claimed in claim 3, wherein dust concentration of said gas used for drying the high-water-content organic waste is 0.05 kg/Nm$^3$ more and 0.35 kg/Nm$^3$ or less.

9. The method of drying high-water-content organic waste as claimed in claim 2, wherein said high-water-content organic waste is high-water-content organic sludge.

10. A cement burning apparatus comprising a dryer for drying high-water-content organic waste of which water content is 40 mass percent or more, the dryer including:
    A combustion gas feed portion configured to:
       only partially extract combustion gas from an exhaust gas passage from a gas outlet of a preheater cyclone other than a highest cyclone to a portion immediately below a material feed portion of another cyclone immediately above the cyclone; or
       extract combustion gas from a ceiling portion of a preheater cyclone of a cement kiln other than a highest cyclone;
    a combustion gas discharge portion in fluid communication with the combustion gas feed portion and configured to return the combustion gas to the fluid passage from which the combustion gas was extracted;
    an organic waste feed portion configured to receive high-water-content organic waste; and
    an organic waste discharge portion fluidly coupled to the organic waste feed portion for discharging dried waste from the dryer, the discharge portion being fluidly isolated from a fluid passage extending between a preheater and a kiln inlet;
    the dryer being configured to bring the extracted combustion gas into thermodynamic communication with the organic waste for drying the organic waste as the combustion gas passes from the combustion gas feed portion to the combustion gas discharge portion and as the organic waste passes from the organic waste feed portion to the organic waste discharge portion.

11. The cement burning apparatus as claimed in claim 10 further comprising a coarse powder separator for separating coarse powder from said combustion gas extracted from one of the exhaust gas passage from the gas outlet to the portion immediately below the material feed portion and the ceiling portion of the preheater cyclone of the cement kiln, wherein combustion gas from which said coarse powder is separated by the coarse powder separator is fed to the dryer.

12. The cement burning apparatus as claimed in claim 10, wherein said dryer is a grinding-type flash dryer, to which the combustion gas is fed so as to directly be contacted with the high-water-content organic waste, for drying the organic waste while grinding it.

13. The cement burning apparatus as claimed in claim 10, wherein dust concentration of said gas that is fed to the dryer is 0.05 kg/Nm$^3$ or more and 0.35 kg/Nm$^3$ or less.

14. The cement burning apparatus as claimed in claim 10 wherein said high-water-content organic waste is high-water-content organic sludge

15. The cement burning apparatus as claimed in claim 11, wherein said dryer is a grinding-type flash dryer, to which the combustion gas is fed so as to directly be contacted with the high-water-content organic waste, for drying the organic waste while grinding it.

16. The cement burning apparatus as claimed in claim 11, wherein dust concentration of said gas that is fed to the dryer is 0.05 kg/Nm$^3$ or more and 0.35 kg/Nm$^3$ or less.

17. The cement burning apparatus as claimed in claim 12, wherein dust concentration of said gas that is fed to the dryer is 0.05 kg/Nm$^3$ or more and 0.35 kg/Nm$^3$ or less.

18. The cement burning apparatus as claimed in claim 11, wherein said high-water-content organic waste is high-water-content organic sludge.

19. The cement burning apparatus as claimed in claim 12, wherein said high-water-content organic waste is high-water-content organic sludge.

20. The cement burning apparatus as claimed in claim 13, wherein said high-water-content organic waste is high-water-content organic sludge.

\* \* \* \* \*